June 30, 1970 T. O. HOLTEY 3,518,413

APPARATUS FOR CHECKING THE SEQUENCING OF A DATA PROCESSING SYSTEM

Filed March 21, 1968 2 Sheets-Sheet 1

INVENTOR
THOMAS O. HOLTEY
BY Faith F. Driscoll
AGENT

INVENTOR
THOMAS O. HOLTEY
BY Faith F. Driscoll
AGENT

United States Patent Office 3,518,413

Patented June 30, 1970

3,518,413

APPARATUS FOR CHECKING THE SEQUENCING OF A DATA PROCESSING SYSTEM

Thomas O. Holtey, Newton, Mass., assignor to Honeywell Inc., Minneapolis, Minn., a corporation of Delaware Filed Mar. 21, 1968, Ser. No. 714,947
Int. Cl. G06f *11/04*
U.S. Cl. 235—153 9 Claims

ABSTRACT OF THE DISCLOSURE

Diagnostic apparatus for utilization in program controlled data processing systems for testing the processing of program instructions effected in accordance with sequence of micro-operations generated by the control sequencing portion of such data processing system wherein the diagnostic apparatus effects testing of the processing of specified portions of a program instruction at predetermined points in time for determining whether sequencing has proceeded normally up to that point.

Background of the invention

The present invention relates to data processing apparatus and more particularly to improved diagnostic apparatus especially useful for detecting faults within a system. Prior art methods of fault detection utilize some form of data comparison to effect error diagnosis. The data comparison may be against predetermined expected results, against simulated expected results or against the results generated via a readout path. (E.g. comparison of the results generated by two or more computers or comparison of the results generated by two different sets of instructions that perform the same function.) These techniques have been employed in both the detection and isolation of faults within the complex portions of data processing systems.

With regard to the latter, a highly complex element in a data processing system is the control portion which is operative to perform instruction sequencing thereby controlling all arithmetic and logical operations within the data processing system. In many instances, a read-only memory has replaced the control portion of the system and has contributed to the maintainability of such systems. The desirability and advantages of such arrangement are set out in detail in an article titled "Maintainability Factor in the Design of Digital Systems Using Microelectronics" by Robert Ward and Thomas O. Holtey, presented at the Western Electronics Show and Convention, Aug. 23–26, 1966.

In some systems, as in the system embodying the subject invention, additional complexity is introduced into the control portion when the system includes a multiple branching capability wherein considerable variations in normal instruction sequencing may be carried out. This capability permits a high degree of flexibility in the programming of such systems. In the system embodying the subject invention, a fixed set of instructions is made available to the programmer wherein each such instruction consists of a succession of elementary or micro-operations. Different sequences of micro-operations (defined as a micro-program) are utilized to extract and execute normal program instructions. Because it has been found desirable to have micro-programs which can be used in common by many machine instructions, each address to be generated, the part of the sequences used, and the order in which they are used, becomes a complex function of the instruction and the type of addressing involved. Consequently, the extraction and execution of the various instructions are seen to involve considerable variations in the sequence of micro-operations to be referenced during the processing of each program instruction.

In the system embodying the subject invention, the above variations in normal sequencing associated with extraction and execution of the various types of program instructions are seen to occur as a function of both internal and external system conditions associated with such branching capability. In such instances, when such a system includes such a multiple branching capability, a complex logical structure is introduced therein to effect the proper sequencing during both the extraction and execution of a normal instruction in response to both external and internal system test conditions. For an example of a system which incorporates this type of capability, reference should be made to the co-pending application of G. Hoff and Ming Miu titled "Multiple Branch Technique," Ser. No. 694,949, filed Jan. 2, 1968, assigned to the assignee of the present application.

Elaborate techniques chosen to aid in the detection and diagnosis of hardware failures in the particularly complex portions of a data processing system have utilized additional logic paths in order to force the data processing system to assume a specific state. Subsequent to cycling a predetermined number of cycles during which time the system is allowed to operate on data, such paths are used to transfer the contents of the various registers to the memory portion of the system for subsequent program diagnosing of system faults. At the expense of considerable hardware introduced into the system, the latter arrangement provides an indirect check of the sequencing of the data processing system by checking the contents of various data registers, subsequent to the cycling thereof, against predicted results.

In addition to the above-mentioned elaborate checking means, others have provided special diagnostic programs for introducing special instructions into the system for the diagnosis of malfunctions in the various portions of a complex logical arrangement. Although such programs may reduce hardware requirements, it will be appreciated that a great deal of time must be expended in development of such special programs. Further, there is always the problem of a malfunction which may cause the program to go astray and destroy valuable information stored in other portions of the system. There may also occur destruction of information in the various data and control registers evidencing the status of the system at the point of failure, which information if preserved could prove valuable in the diagnosis of such failures.

Summary of the invention

Accordingly, it is a primary object of the present invention to provide apparatus requiring a minimum of circuit logic which is capable of completely diagnosing malfunctions in a data processing system during the processing of any normal instructions and in particular one capable of monitoring and detecting faults in portions of the sequencing logic associated with such instruction processing.

It is a further object of the invention to provide diagnostic hardware which dynamically monitors the sequenching data of a data processing system and is operative upon the first indication of a fault to initiate the termination of the instruction being monitored.

The foregoing objects are achieved in a preferred embodiment of the present invention wherein the diagnostic hardware includes a diagnostic counter, a comparator, and a diagnostic address storage register. Starting either with the extraction or the execution of a normal program instruction, further portions of the instruction are "traced" during the normal processing thereof. In the process of tracing an instruction, the state of which the data processing system has advanced during the processing of a portion of the instruction under the control of the cycling of the control portion of such system, as defined by an address register of the control portion, is anticipated and tested at a particular point in time in order to ascertain whether the processing thereof has advanced to that point.

In the implementation of the present invention, a predicted address is stored in the diagnostic address storage register and a predetermined count is stored in the diagnostic counter which count corresponds to the portion of the instruction to be traced. The count is specified in terms of the number of cycles which must be sequenced through by the control portion of the system to reach that particular state. During the performance of a normal instruction, the diagnostic hardware, upon having been cycled the indicated number of cycles, compares the contents of the diagnostic address storage register with the contents stored in an address register of the control portion in order to determine if sequencing has proceeded properly. It will be appreciated that the digital representation then in the address register of the control portion denotes the particular state to which the data processing system has advanced. If a noncomparison exists between the contents of the two registers, steps are taken to terminate the instruction in order to preserve the contents of the various registers of the system for subsequent examination in order to further isolate the particular failure. It will be appreciated that the complex set of manipulative operations required to effect such isolation down to the particular faulty component need not be done by the faulty processing system.

In the preferred embodiment, the diagnostic hardware is utilized to diagnose a failure within any one of various portions of the complex multiple branching logic structure comprising the sequencing logic of the associated data processing system. In the preferred arrangement, additional memory coding of the read-only memory control portion of the system is used to control the diagnostic operation of the system as well as store special micro-operation sequences which have been included specifically to implement special diagnostic instructions. Since the diagnostic capability accesses the system operation during the processing of a normal instruction, the storage of intermediate storage functions uses for the most part pre-existing data paths.

The foregoing objects and features of novelty which characterize the present invention, as well as other objects of the invention, are pointed out with particularity in the claims annexed to and forming a part of the present specification. For a better understanding of the invention, its advantages and specific objects attained by its use, reference should be had to the accompanying drawings and descriptive matter in which there is illustrated and described a preferred embodiment of the invention.

Description of the preferred embodiment

Figure 1:
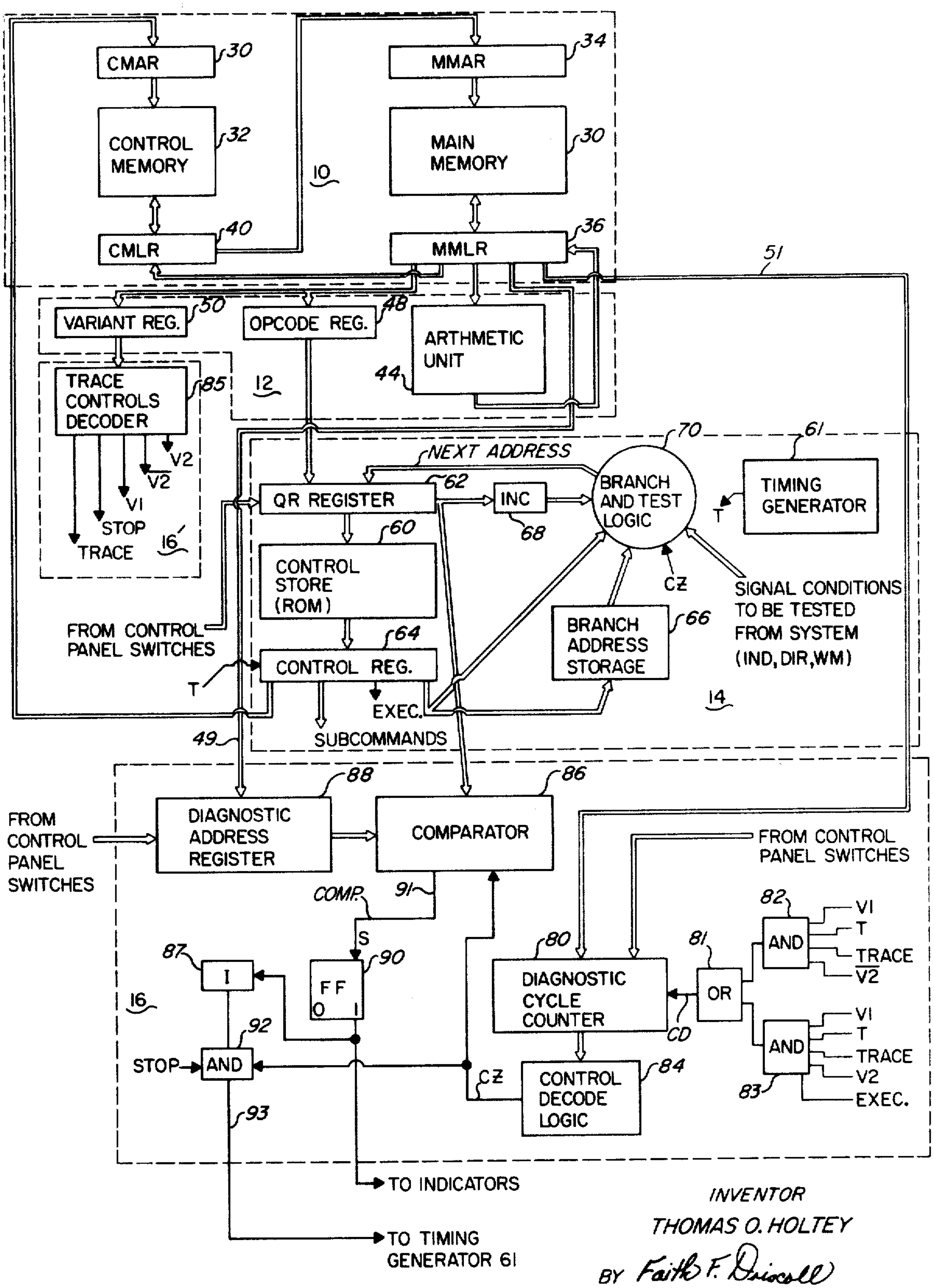
FIG. 1 is a diagrammatic showing of a computer system embodying the present invention.

Referring specifically to FIG. 1, there is disclosed in diagrammatic form, a data processing system of general type embodying the features of the present invention. With reference to FIG. 1, the data processing system is shown as comprising: a memory portion 10, arithmetic or data manipulative portion 12, a control portion 14, and additional diagnostic hardware portion 16 and 16'.

Considering a more detailed description of the components comprising the memory portion 10 of FIG. 1, there is disclosed a main memory 30 which may comprise a multi-plane, coincidence current, core storage unit of a form described in the patent of Henry W. Schrimpf bearing Pat. No. 3,201,762. The main memory 30 of FIG. 1 may be accessed from a control memory 32 by way of a main memory address register 34; the latter being adapted to store the address of a location within the main memory 30 currently being referenced. Connected to the output of the main memory 30 of FIG. 1 is a main memory local register 36 adapted to receive and store the contents of a referenced main memory location.

The control memory 32 may be implemented in the same manner as that described relative to the main memory 30 and has also associated therewith a control memory address register 38 as well as a control memory local register 40.

The control memory 32 may comprise a plurality of multi-position storage registers connected in a conventional manner; each of which is adapted to store information necessary to the processing of a normal program instruction. Among other things, these storage registers contain the addresses of instructions and data being processed during the operation of a program. In the preferred embodiment of the invention there are included in the control memory 32, A and B operand address registers, sequencing and cosequencing registers (not shown) for storing digital representations of main memory addresses to be used in referencing the next instruction in a program, as well as present and starting location registers associated with I/O data transfer operations. There is normally associated with memory portion 10, increment-decrement logic as well as temporary storage means (not shown) for modifying addresses transferred from the control memory local register 40 to the main memory address register 34; such modified addresses being restored in control memory 32 for the subsequent addressing of the main memory 30.

The arithmetic portion 12 of the system may comprise a conventional adder. An example of such an arrangement may be found in the text of R. K. Richards entitled "Arithmetic Operations in Digital Computers," D. Van Nostrand Company, 1955. The arithmetic portion 12 further includes two additional registers 48 and 50 which are provided for storing an operation code and an operation code modifier portion of an instruction referenced hereinafter as the OP code and variant registers respectively.

In the preferred embodiment, the control portion or control sequencing portion controls all transfers of signals throughout the data processing system and comprises an addressable, electrically alterable, control store (ROM) 60. The latter is cyclically operated in synchronism with timing signals T supplied by a timing generator 61. The timing generator may comprise a master clock (not shown) for generating timing signals required for synchronizing the operation of all other units within the system. The control store (ROM) 60 comprises 4096 storage locations each of which contain 120 bits of information. The storage locations within the control store 60 may be referenced by way of a 12 bit address register 62 (QR register), the referenced contents of which appear as an output in a control register 64. The cyclically produced information contents of the control register 64 comprise a number of distinct fields including a test field associated with the establishment of control store memory branching, an address field which serves as a source of addresses which are selectively stored in a branch address storage 66. The branch address storage 66 may comprise a plurality of individual storage registers. The remaining bits of the control register 64 are allocated to the generation of sub-command signals which are distributed to the gates and storage registers comprising the data processing system for the control and synchronization of the various data transfers therein.

The QR register 62 has as its source of addressing information: OP code register 48; an incremented or decremented version of the preceding address as generated by increment-decrement logic 68; or, in the case of a branching operation, one of the registers comprising the branch address storage unit 66. A further address source is shown as constituting a set of control panel switches which may be mounted on an associated control panel (not shown).

In the preferred embodiment, the selection of a next address is effected by way of branch and test logic 70 which is adapted to be conditioned by test conditions existing within the data processing system and by previously mentioned test field of the cyclically produced informational content of the control register 64. Further details regarding the manner in which branch addresses are selected and for the implementation of the branching logic, reference may be made to the previously mentioned copending application of George Hoff and Ming Miu. The branch and test logic 70. The branch address storage unit 66 and the increment-decrement logic 68 is seen to constitute the sequencing logic of the system of FIG. 1.

The diagnostic hardware portion 16 and 16′ basically comprises a diagnostic cycle counter 80, a diagnostic address register 88, and a comparator 86. The diagnostic address register 88 is a 12 bit storage register of conventional design which receives as a source of addresses, information in the form of a program loaded address from either the main memory 30 by way of a transfer bus 49, or from a second set of control panel switches of the associated control panel.

The cycle counter 80 may be of conventional design and in the present embodiment is a 12 bit counter adapted to receive information in the form of a program count from either the main memory 30 by way of a second transfer bus 51 or via another set control of panel switches on the associated control panel. The counter 80 is adapted to have its count modified, or decremented, in synchronization with the cycling of the control store 60. The latter operation is effected by way of a countdown signal CD, appearing as an output from an OR gate 81 by a signal appearing at the output of either an AND gate 82 or an AND gate 83.

AND gates 82 and 83 are conditioned by a timing signal T from the timing generator 61 and the control signals Trace, $V_1$, and $\overline{V}_2$ generated by a trace controls decoder 85 in response to signals applied by way of the variant register 50. The AND gate 83 receives as an additional input a sub-command control signal EXEC from the control store 60.

The output of the diagnostic counter 80 is connected to a conventional control decoder logic circuit 84 which is adapted to generate an output signal when the contents of counter 80 have been modified to a predetermined count, which in the preferred embodiment corresponds to a count of zero. This output signal is applied as an input to a conventional comparator circuit 86 which is adapted to receive as inputs, an output from the QR register 62 and an output from the diagnostic address register 88.

The output of the comparator 86, appearing on the line 91, is applied as a set input to a flip-flop 90. The output of the flip-flop 90 is connected to a diagnostic indicator which may comprise a signal light mounted on the above-mentioned control panel. The output of the flip-flop 90 additionally is applied by way of an inverter 87 to an AND gate 92 which is further conditioned by a signal Stop from the trace decoder 85 and a signal CZ from the control decode logic 84.

The output of the AND gate 92 is connected as an input to the timing generator 61. Upon the activation thereof, AND gate 92 is adaptde to produce a signal for inhibiting the generation of further timing signals, thereby stopping system operation.

It will be appreciated that all double drawn lines appearing in FIG. 1 are multiple conductor lines for conveying several bits of information in parallel..

The manner in which an operator may initiate a diagnostic trace operation with respect to monitoring the operation of a data processing system, will now be described in terms of extracting or fetching a variable length program instruction from main memory 30.

In a preferred embodiment, the main memory 30 is oriented on a character basis whereby the processing of each program instruction proceeds with the characters being transferred one by one out of successive main memory locations. An example of such a system may be found in Pat. 3,331,056 to Walter R. Lethin and Michael H. Blume. In this type of arrangement, the formating of instructions is such that the OP code may constitute a single character while the address fields, corresponding to the A and B address portions of a two address format, utilize a variable number of characters. In the explanation of the preferred embodiment of the subject invention, addressing of main memory is to proceed in a two-character addressing mode; that is each of the two A and B address fields have a length of two characters. The formating is such that each instruction may include a variant character for modifying the OP code of a succeeding instruction or to extend the fundamental definition of the current instruction.

In a character oriented system, each character comprises a predetermined number of information bits of the nature described in the Lethin et al. patent and one or more punctuation bits. The latter may appear in the form of a word mark which is associated with the character following the last character of an instruction to indicate to the central processing unit of the data processing system that the instruction has been extracted. More specifically, once extraction is initiated, the referencing of successive main memory locations continues until the word mark punctuation is detected during the extraction of a character, identifying the character as the OP code of the succeeding program instruction, which indicates that the extraction phase of the program instruction presently being processed has been completed. It will be apparent that conventional decoder logic may be associated with the main memory output register for effecting word mark sensing. Such logic will become operative at that time to generate a signal (WM) causing the setting of an associated control flip-flop for indicating the latter condition.

Relative to the various types of address modification effected during the extraction cycles of the particular instruction being processed; the subject system is capable of being operated in a direct, indirect or indexed addressing mode. In the case of direct addressing, the addressing directly specifies the address location of the particular operand in main memory to be referenced; while with indirect addressing, the address part of the instruction specifies an address, the contents of which specify the address at which the desired operand is located in main memory. Where indexing is specified, the contents of an index register are automatically added to the address field in the instruction.

The particular mode of addressing to be followed may be indicated by a tag field within the particular instruction or by a special bit in a predetermined bit position in the OP code of the instruction. The latter bits or bit may be either stored off in a special register or initially decoded thereby generating control signals representative of a condition associated with the particular mode of addressing to be followed during the processing of the particular instruction.

Figure 2:
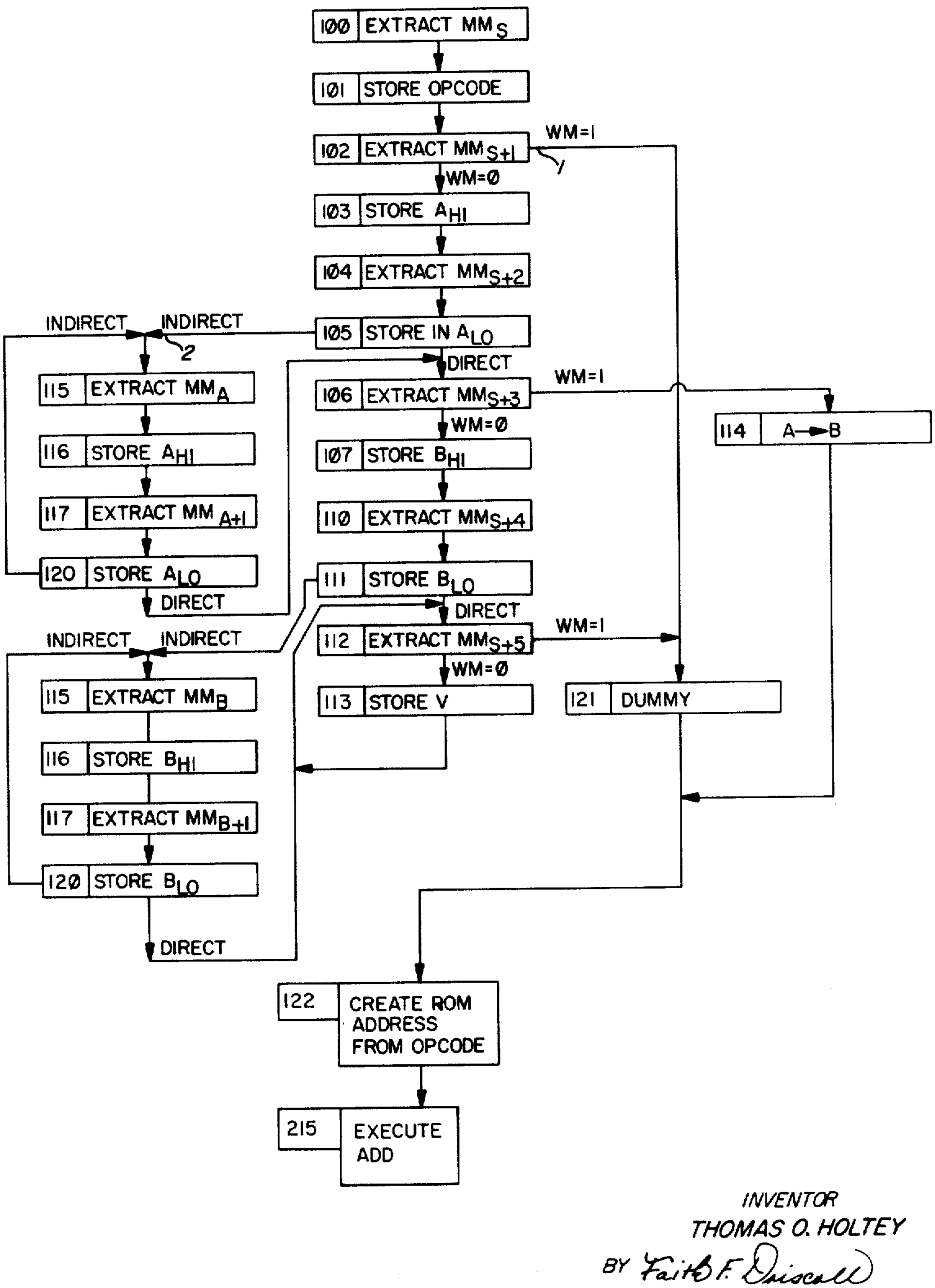
FIG. 2 depicts a flow diagram of extraction operations relating to various formatted instructions used in explaining the operation of the present invention.

Referring now to FIG. 2, therein is illustrated the normal control store sequence for extraction operations common to a number of program instructions having a variable length format. Each box in FIG. 2 identifies a particular storage location referenced during a single cycling of the control store (ROM) 60. Upon the referencing of a particular storage location, a set of sub-command control signals are generated which effect the micro-operations associated with the operation indicated therein. There are, as indicated, two control store memory cycles for each main memory cycle. During the first cycle, the sub-commands associated with the referencing of a single store character of an instruction are generated. During the second control store memory cycle, the sub-command signals associated with the transfer of the particular character referenced to the appropriate register are generated.

Several examples of different instruction formats for an Add instruction derived from the flow diagram of the FIG. 2 are given below. Each example indicates the particular address sequence of memory locations with the control store 60 referenced during the extraction of the individual characters of an instruction.

(1) ADD/A/B—100,101—11,112,121,122,215,—.
(2) ADD/A—100,101,—105,106,114,122,215,—.
(3) ADD/A indirect/B—100,101—105,115,116,117, 120,106,107,—11,112,121,122,215—.
(4) ADD/A/B indirect/V/V—100,101,—111,115,116, 117,120,112,113,112,113,112,121,122,215.

If there exists some hardware fault in the sequencing logic of the data processing system of FIG. 1, the normal internal sequencing will be altered in a manner normally resulting in the referencing of a control storage location or locations which differ from the sequence of locations normally referenced. Since the sequence of control store (ROM) locations is predictable for each instruction format and the state of the control store (ROM) 60 is definable at any particular point of time by the current control store address, it is possible to determine the earliest point in time when a fault occurs in the system by monitoring control store cycling relative to instruction processing in accordance with the teachings of the subject invention. The special diagnostic hardware 16 and 16' is utilized to monitor the selection of control store (ROM) addresses during each step of the extraction operation relative to the processing of a normal program instruction by comparing the selected address against the known or predictable control store address which should be selected at a particular point in time. It will be clear that the diagnostic hardware may be also employed in the same manner to monitor the address sequencing of control store (ROM) storage locations during the normal execution of a program instruction as well.

In the preferred embodiment, in order to facilitate the maintenance and diagnosis of the data processing system of FIG. 1, two instructions have been added to the normal instruction repertoire. These are a diagnostic trace mode instruction (DTM) and a diagnostic control branch instruction (DCB). The DTM instruction permits selective tracing of any normal program instruction starting with either the extraction or execution phase thereof.

The DTM instruction has the format: F/A/B/V. The F or OP code is recognized as a legal OP code when the system is in a diagnostic mode. The A address specifies the address of the program instruction in the main memory 30 to be traced, while the B address specifies the trace parameters which comprise a four character field of 6 bits each. The first two characters of the field define a predicted address while the second two characters define the number of control store memory cycles to be traced. Predetermined bit positions within the 6 bit variant character; V, specify a tracing operation and whether that operation begins with either the extraction or execution phase of the instruction being traced. Other bit positions within the same character may be used to indicate other pertinent operations associated with tracing of the particular program instruction such as the termination of the "tracing" operation upon the detection of an error condition or the storing off the contents of the various registers within the data processing system.

The normal instruction format used for the DCB instruction is as follows: F/A/V1/V2 wherein the variant characters V1, V2 specify the functions to be tested, in particular, the state of the flip-flop 90 of FIG. 1. In the case of a typical branch instruction when any condition tested for is present, the program branches to the location specified by the A-address and the contents of the sequence counter are stored in the B-address register of the control memory 32. In order to conserve on hardware in the diagnosis of system faults during initial checkout, the normal extraction cycles for the diagnostic instructions are bypassed. A diagnostic extraction mode is entered whereby these diagnostic instructions are extracted from the main memory 30 utilizing a relatively small number of sub-commands generated by the control store 60. The extraction of diagnostic instruction, for example, may be effected by the control store 60 of FIG. 1 upon initialization of the system wherein all the pertinent control and memory registers are set to zero, and a predetermined address is entered manually into the QR register 62. Upon the subsequent cycling of control store 60 through a small number of storage locations, the appropriate sub-command signals are generated as outputs from the control register 64 thereby effecting the extraction of the diagnostic instructions.

It will be appreciated that in order to effect the above testing, some definite amount of system hardware is presumed to be functioning correctly; this hardware being referred to in the art as "hardcore." The system "hardcore" presumed to be working properly includes: the main memory 30 and the control store 60 which may be checked out independently of the system; data paths used by the DTM and DCB instructions which may be verified by entering data in the associated control panel and verifying the transfer thereof; and the diagnostic control logic 16, the operation of which may be also independently verified.

The following example is given in order to illustrate the manner in which the cycling of the control store 60 may be monitored during the processing of a particular program instruction for the purposes of detecting, at the earliest point in time, faults within the sequencing logic of the control portion 14 and in particular faults within a portion or portions of the complex branch and test logic 70. More specifically, during the extraction process of any normal program instruction, certain signal conditions generated within the system will be applied to the branch and test logic 70 which result in the selection of different sequences of control store (ROM) addresses at particular instances of time in accordance with the particular format of the instruction being processed. Accordingly, faults which cause erroneous generation of these signal conditions result in incorrect internal sequencing of the control store 60.

It is assumed that the first instruction of a program which has been previously loaded into the main memory 30 to be "traced" is an Add instruction having the format: Add/A indirect /B. An instruction format has been chosen which includes several branching points; these points being based on the previously mentioned system conditions (i.e. those related to word mark sensing and mode of addressing).

A short sequence of diagnostic instructions are used to analyze the subject Add instruction wherein successive testing is effected subsequent to the processing of increased portions or increments of the instruction. Where no previous instructions have been processed, it has been found more desirable to have the diagnostic instructions specify the processing of very small increments initially. This reduces the necessity of having to unduly repeat the processing of the same portions of the instruction in order to more closely determine the first instance where there is a departure from normal sequencing.

A representative sequence of diagnostic instructions for "tracing" the processing of the subject Add instruction derived in accordance with the address sequence of corresponding to a third of the four examples of different formats given previously is given below.

A B<br>
DTM (0010) (101,2)

A V1V2<br>
DCB (branch address) (test state of indicator)

A B<br>
DTM (0010) (103,4)

A B<br>
DTM (0010) (116,8)

A B<br>
DTM (0010) (215,14)

It will be noted that the A address of each DTM instruction specifies the same main memory address and consequently the processing of each of the specified portions of the subject Add instruction is initiated from the same point which in the present instance corresponds to the beginning of the processing of such instruction. The initiation automatically establishes the requisite conditions (i.e. loading the various data and control registers) for effecting the normal internal sequencing during the subsequent processing of portions of the subject instruction and also eliminates the need for additional hardware for establishing particular bit configuration within the various data and control registers required for further sequencing.

The first number identified by the B address of the DTM instruction specifies the particular control store (ROM) address to which sequencing has been advanced when the specified portion of the subject Add instruction has been processed. The second number specifies the portion of the Add instruction to be processed and is given in terms of the number of control store (ROM) cycles to be sequenced through for effecting such processing.

Although only a single DCB instruction is shown as having been inserted into the sequence of diagnostic instructions, it may be desirable to have a DCB succeed each DTM instruction for testing purposes. In the event of no error having been detected, a subsequent DTM instruction is referenced which causes new parameters to be loaded into the diagnostic hardware for processing greater portions of the subject Add instruction at the conclusion of which testing is again effected. Where the variant character of the DTM instruction specifies that processing is to be terminated in the event of error, no DCB instruction need be inserted in the sequence of diagnostic instructions.

The above short sequence of diagnostic instructions effects testing at those main memory cycle intervals which occur after the extracted characters of the particular instruction have been stored in the various registers of the data processing system. This enables subsequent examination of those registers which should have received the particular characters of the instruction.

A first DTM instruction is extracted from the main memory 30, the extraction operation being carried out by a group of sub-commands generated by the control store 60 in the manner previously indicated. As mentioned previously, the A address of the subject DTM instruction specifies the address in the main memory 30 of the instruction to be traced while the B address specifies the address of a four character field which defines the trace parameters.

Upon completion of the extraction of the first DTM instruction, the A register of the control memory 32 contains the address 0010 while the B register of the control memory 32 contains the B address of the DTM instruction. The B address specifies a four character field in the main memory 30 in which is stored digital representation of the trace parameters 101, 2. The first two characters of the field specify the predicted address 101 while the second two characters specify that two cycles of the Add instruction are to be processed. Also at this time, the OP code of the DTM instruction has been stored off in the OP code register 48 while the associated variant character of the instruction has been stored in the variant register 50.

The contents of the variant register 50 which store the variant character of the DTM instruction are automatically decoded by the trace control decoder 25. Since the instruction is a diagnostic trace instruction and the "tracing" operation with respect thereto is to be initiated in the extraction phase, the signals Trace, V1 and $\overline{V2}$ denote the fact that the "tracing" operation is to begin with the extraction of the Add instruction. The variant character is assumed to be coded such that the signal Stop does not appear as an output of the decoder 25 since a DCB instruction has been inserted to succeed the DTM instruction. Therefore, the DTM instruction is not terminated upon an error condition.

The aforementioned signals: Trace, V1 and $\overline{V2}$ are applied as inputs to the AND gate 82 along with the timing signal T from the timing generator 61, for to effect the modification of the contents of the diagnostic cycle counter 80. This modification proceeds in accordance with the cycling of the control store 60 during the processing of the Add instruction.

At the conclusion of the extraction of the DTM instruction and subsequent to any required modification, the contents of the OP code register are transferred to the QR register 62 for initiating a different sequence of sub-command signals to effect the execution of the DTM instruction. It will be appreciated that since all instructions have a unique starting address point in the control store 60 for effecting the execution thereof, the transfer of the OP code to the address register 62 effects a branch to a unique starting point associated with the execution of the DTM instruction.

During the execution phase of the DTM instruction, the generation of sub-command signals appearing at the output of the control register 64 cause the contents of the A address register of the control memory 32 to be read out into the CMLR register 40 and transferred to the MMAR register 34 for referencing of the main memory 30 for extraction of the various characters of the instruction being "traced." However prior to this, the requisite sub-command signals are generated which effect the loading of the pertinent portions of the diagnostic hardware 16. More specifically, the contents of the address B register of the control memory 32 are read out from the control memory 32 and transferred to the MAR register 34 for referencing of the main memory 30. Each of the two pairs of characters constituting digital representation of the parameters 101 and 2 which appear at the output of the register 36 are loaded into the diagnostic address register 88 and diagnostic counter 80 respectively; these transfers being effected by way of the transfer busses 49 and 51. The appropriate sub-command signals to effect the above operations are generated by the cycling of the control store 60 during the execution of the DTM instruction.

After the loading of the pertinent diagnostic registers has been effected, sub-command signals which are then generated by the control store 60 during the subsequent cycling thereof are exclusively associated with the extraction of the characters of the subject Add instruction. The portion of the extraction operation of the subject instruction specified by the diagnostic counter 80 is carried out and upon the completion thereof, indicated by the diagnostic counter 80 having been decremented to zero, a comparison is effected between the contents of the QR register 62 and the contents of the diagnostic address register 88 for ascertaining whether or not internal address sequencing has advanced to where it should be at that point in time.

With reference to FIGS. 1 and 2 relative to the first DTM instruction, two cycles of the extraction portion of the processing of the subject Add instruction are executed. At the completion of the first two cycles the first character (OP code) is seen to reside in the OP code register 48. This execution is effected as follows. Since the AND gate 82 at the conclusion of the previous cycle of the control store 60 is partially conditioned by the signals $\overline{V1}$, $\overline{V2}$, and Trace, the generation of the next timing pulse T by the timing generation 61 causes the activation of the AND gate 82 which is operative at this time to produce a decrementing signal, CD as an input to the counter 80 applied by way of the OR gate 81. The counter 80 had been previously storing a binary two and the signal CD causes the counter to be decremented to a count of one. Since the decode logic 84 is operative to produce an output signal only when the counter contents correspond to all zeros, no output signal is applied to the comparator 86. Consequently, no comparison is effected between the contents of the QR register 62 and the diagnostic address register 88 at this time and the flip-flop 90 remains in its initial or reset state.

During the first cycle of the control store 60, a set of sub-command signals are read out from the appropriate location in the control store 60 which corresponds to the address 100 and appear as an output of the control register 64. These signals cause the normal sequence of operations relative to that portion of the extraction operation to be performed. As mentioned above and as indicated in FIG. 2, this involves the particular operations associated with the extraction of the first character (OP code) of the Add instruction from the main memory 30. These operations include, for example, the addressing of the control memory 32 for reading out the contents of the sequence counter which now stores the A address (0010); specifying the storage location $MM_S$ into the register 40; transferring the contents to the memory address register 34 for referencing the contents of the main memory location specified thereby, which contents are then read out into the memory register 36. Since, as illustrated by FIG. 2, there should be no branching during the next cycling of the control store 60 (i.e. the contents identified by the next sequential address 101 should be referenced), the incremented contents of the QR register 62 should be the address source during the next cycle. Thus, when the system is functioning properly, the contents of the QR register 62 are incremented by one by the incrementor 68 and returned to the register 62 by way of the branch and test logic 70.

During the next cycle, initiated by a second timing signal T from the timing generator 61, a second set of sub-command signals is generated upon the readout of the contents of the next sequential memory location. This location is specified by the previously incremented contents (101) of the register 62. The sub-command signals appearing at the output of the register 64 effect the sequence of operations associated with a next operation indicated by FIG. 2. This corresponds to that of storing the OP code character. These operations, for example, include transferring the OP code from the memory register 36 to the register 48; incrementing the contents of the sequence counter contained in the register 40; and restoring the same in the control memory 32. Additionally, the contents of diagnostic counter 80 are again decremented by one by the application of the decrementing signal CD thereto. As a consequence of such decrementing, the counter contents now corresponds to an all zero count which upon being decoded by the control decode logic 84 causes a signal CZ to be generated. The signal CZ is aplied as an input to the comparator 84 and causes a comparison to be effected between the contents of the QR register 62 and the diagnostic address register 88. Assuming that the portion of the extraction operation has proceeded normally up to this point, the address stored in the register 62 and the predicted address stored in the address register 88 both correspond to the value 101 and therefore the comparator 86 generates an output signal on line 91. This signal is applied to the flip-flop 90 switching it to its set state indicative of a favorable comparison between the contents of the two registers 62 and 88.

The output signal CZ appearing as an input to the branch and test logic 70 causes a predetermined address to be forced into the QR register 62 as a next address. This is effective to produce a small group of sub-commands to effect the extraction of the next instruction of the test sequence (i.e. the DCB instruction) from the main memory 30. The extraction proceeds in the same manner as that described relative to the extraction of the DTM instruction. At the conclusion of the extracting process, the OP code of the DCB instruction is stored in the register 48, while the branching A address and V variant characters are stored in the A address register of the control memory 32 and in the variant register 50 respectively. During instruction execution, the OP code is transferred from the register 48 to the QR register 62 and effects the subsequent generation of a group of sub-commands which includes signals for testing the state of the flip-flop 90. Since the condition tested is not present, i.e. flip-flop 90 is in its set state, no branching occurs and the flip-flop is then reset in readiness for subsequent testing. At the termination of the DCB instruction, the QR register 62 is again forced into a predetermined state and the small group of sub-commands are generated as an output from the control store 60 for effecting the extraction of the next instruction in the test sequence from the main memory 30 which corresponds to the second DTM instruction listed.

During the execution of the second DTM instruction, the parameters 103 and 4 are loaded into the diagnostic address register 88 and the diagnostic counter 80 respectively. In accordance with the parameters specified and with reference to FIG. 2, it is seen that in this instance a greater portion of the subject instruction is to be traced before testing is effected. The tracing is again initiated from the beginning of the extraction operation as defined by the A address field of the subject DTM instruction. Upon having completed the portion of the Add instruction specified by the contents of the diagnostic counter 80, the OP code and the first character $A_{HT}$ of the A address of the Add instruction stored in main memory locations $MM_S$ and $MM_{S+1}$ respectively, should have been stored in the OP code register 48 and in the A address register of the control memory 32. This is true only if the portion of the sequencing logic associated with processing the above indicated portions of the instruction is functioning properly. Specifically, the untested portion of the instruction being traced indirectly involves logic associated with word mark sensing (WM). This logic is normally operative upon the detection of a work mark to generate the appropriate signal (WM) as an input to the branch and test logic 70 for effecting a sequencing to the appropriate storage location within the control store 60. However, the format of the subject Add instruction being extracted is such that branching should not occur at this point.

It is assumed that a fault exists in the above word mark using logic whereby the signal (WM) is erroneously generated by such logic and is applied as an input to the branch and test logic 70. This causes an incorrect branching to one of the addresses stored in the branch address storage 66. The manner in which the diagnostic hardware is operative to detect the presence of such fault as a consequence of such incorrect branching corresponding to the point 1 of the FIG. 2 is described below.

During the first two cycles of the control store 60, the sequence of operations to effect the referencing of the OP code character of the Add instruction from the main memory 30 and the transfer of it to the register 48 along with the decrementing of the counter 80 proceeds as described with reference to the execution of the first DTM instruction. During a third cycling of the control store 60, the incremented contents (103) of the register 62 are used to reference the next sequential memory storage location of the control store 60. Upon the referencing thereof, a group of sub-command signals appear as an output of the control register 64 and effect the extraction of the next character of the Add instruction from the main memory 30 stored in the location ($MM_{S+1}$) as specified by the incremented contents of sequence counter of the control memory 32. This character is read out into the register 36. At this time, the contents of the diagnostic counter 80 are again decremented by one, in the manner previously indicated, by the application of signal CD thereto and now stores a count of one.

In accordance with FIG. 2, during a fourth cycling of the control store 60, the contents of the memory register 36, now storing the character ($A_{HI}$) previously referenced, are transferred to high order bit positions of the A address register of the control memory 32 (i.e. first character of the two character A address). However, since a fault has been assumed to exist in the mark sensing logic, this character is sensed by the mark sensing logic as a word mark character and causes the erroneous generation of the signal WM indicative of the fact that the extraction operation relative to the subject Add instruction has been completed. The signal (WM), indicative of the latter condition, is applied as an input to the branch and test logic 70. A particular one of the addresses previously stored off in the branch address storage 66, transferred thereto during previous cycling of the control store 60, is then transferred to the QR register 62 as a next address instead of the incremented previous address which would occur if the processing of the subject instruction had proceeded normally.

When the diagnostic counter 80 is again decremented by one by the application of the signal CD upon the generation of the timing signal T, the contents of the counter 80 are all zeros. The decode logic 84 is operative upon the decoding the all zero contents to produce as an output, the signal CZ. The comparator 86 is conditioned by the application of the signal CZ thereto to effect a comparison between the contents of the address register 62 and the contents of the diagnostic address register 88. As a consequence of the assumed fault, there is no comparicson therebetween and the flip-flop 90 remains in its reset state. Thus, due to a fault in the word mark sensing logic, the processing of that portion of the instruction specified by the contents of the diagnostic counter 80 does not proceed normally and the fault is detectable by a noncomparison between the address stored in the register 62 of the control store 60 and the predicted address stored in the diagnostic address register 88.

Up to this time, the AND gate 92 had only been partially conditioned by the application thereto, of the signals Stop and the inverted output of the flip-flop 90. However, gate 92 is fully conditioned and made active upon the application of the signal CZ from the control decode logic 84. The AND gate 92 is operative at this time to produce an output signal on line 93 which is effective to inhibit the generation of further timing pulses from the timing generator 61, thereby terminating the DTM instruction. The Stop signal, as mentioned previously, may have been generated either by the setting a particular bit position in the variant character of the DTM instruction to a binary one or by the manual selection of a switch associated with the control panel. In the event such signal is present, it is seen that the tracing operation is terminated immediately tby the first noncomparison detected by the diagnostic control logic 16. This, as pointed out previously, prevents the destruction of the contents of the various registers of the system thereby preserving such contents for subsequent diagnosis of the system fault.

If the Stop signal is not present as an input to the AND gate 92, the results of the previous comparison may be tested by an execution of a second DCB instruction. The extraction and execution of the subject instruction is effected in the manner previously described. Since in this instance, the condition to be tested for is present, i.e. the flip-flop 90 is in its reset state, the program branches to the location in the main memory 30 specified by the A address of such instruction and the contents of the sequence register are stored in the B address register of the control memory 32. A diagnostic routine may then be subsequently initiated to store off the contents of the various registers of the system for determining the exact cause of failure by the subsequent examination of such contents.

Assuming the nonexistence of a fault in the word mark sensing logic and continuing on with the tracing of the subject Add instruction, the next diagnostic instruction in sequence corresponding to the third DTM instruction, is extracted and executed. During the execution thereof, the parameters 116, 8 are loaded into the diagnostic address register 88 and the diagnostic cycle counter 80 respectively. From FIG. 2 it is seen that the processing during the first four cycles of the control store 60 proceed in a manner as indicated previously and the first character $A_{HI}$ at the completion of the fourth cycle will have been stored in the high order bit positions of the A address register of the control memory 32. The diagnostic counter 80 previously registering a count of 8 now contains a count of 4 as a consequence of having been decremented with each cycling of the control store 60 by the signal CD.

During the next two cycles, the contents of storage locations corresponding to the addresses 104 and 105 are referenced and the two groups of sub-command signals appearing at the output of the control register 64 effect the extraction of the second character of the A address of the subject instruction. The first group of sub-command signals effect the referencing of the contents of location ($MM_{S+2}$) in the main memory 30 specified by the previously incremented contents of the sequence counter. The second group of sub-command signals effect the transfer of such contents of to the low order bit positions of the A address register of the control memory 32. Upon the completion of the above operations, the contents of the diagnostic cycle counter 80 decremented in accordance with each cycling of the control store 60 registers a count of two.

With reference to the FIG. 2, it is seen that the remaining two cycles involve a departure from the normal address sequence to effect the generation of sub-command signals to carry out the indicated address modification operation. More specifically, the instruction being traced calls for indirect A addressing. Therefore, during the normal processing of the subject instruction, there will occur a branching from the normal sequence of successive storage locations identified by the address 100–105 to different sequence of storage locations starting with the address 115. The above branching is indicated by point 2 in the FIG. 2.

The sub-command signals generated as an output from the control register 64 during the subsequent cycling of the control store 60 effect the extraction of the two characters stored in the storage locations ($MM_A$ and $MM_{A+1}$) in the main memory 30 wherein the main memory 30 is referenced by a starting address corresponding to the present contents of the A address register in the control memory 32. The register contains the previously extracted two characters $A_{HI}$ and $A_{LO}$. The operation of that portion of the sequencing logic involved in effecting indirect addressing is verified upon the completion of the subject DTM instruction since the parameters specify a point in time subsequent to such branching.

As illustrated by FIG. 2 the particular point selected as defined by the parameters 116, 8 corresponds to a point in time wherein the first character of the A address of instruction subsequent to the indicated address modification will have been extracted from the storage location $MM_A$ of the main memory 30 and stored in the high order bit positions of the A address register of the control memory 32.

As mentioned previously, the different modes of addressing may be indicated by special bit positions within the address character itself. Such bits may be stored off in an auxiliary register for subsequent decoding by conventional means not shown. Upon such decoding there will have been generated a particular control signal IND indicating that an indirect mode of addressing is to be followed with respect to the A address of the subject instruction. Therefore, a control signal, IND, indicating this conditions the branching logic 70 to transfer to the address register 62 as a next address, an address stored in a particular one of the registers of the branch address storage 66 instead of the previously incremented contents of the register 62. This particular address should correspond to the value 115.

During the next cycling of the control store 60, the readout of the contents of the storage location thereby referenced produce a group of sub-command signals which effect the extraction of the first character ($A_{HI}$) of the A address from the storage location $MM_A$ of the main memory 30. At the completion of this cycle, the diagnostic counter 80 has its contents again modified by one and at this time contains a count of one.

The character $A_{HI}$ residing in the register 34 is transferred to the high bit positions of the A address register of the control memory 32 during the next cycling of the control store 60. At this time, the contents of the diagnostic counter 80 is decremented so as to contain an "all zero" count. This "all zero" count is decoded by the control decode logic 84 which is operative to produce as an output, the signal CZ which causes the comparator 86 to effect a comparison between the predicted address stored in the diagnostic register 88 and the contents of the address register 62 of the control store 60. If the processing of the subject instruction has proceeded normally, there will be a comparison between the two addresses at the particular time specified and the flip-flop 90 will be switched to its set state. If there is a fault associated with address sequencing up to this point, the flip-flop 90 remains in its reset state. As mentioned previously, the state of flip-flop 90 will be effective in the presence of a Stop signal to produce an output signal on the line 93 which is effective to inhibit the generation of further timing signals by the generator 61 thereby terminating the DTM instruction. Alternatively, the state of the flip-flop 90 may be tested by another DCB instruction in the manner previously indicated.

Assuming that the above faults have been corrected and the system appears to be functioning properly, the last diagnostic instruction executed in the test sequence specifies parameters which will complete the tracing of the entire extraction operation. These parameters specify a predicted address of 215 and 14 cycles as the portion of the subject Add instruction to be processed. It will be appreciated that the particular portion of the Add instruction which has not been traced involves much of the same logic whose operation has been previously tested.

Once the control store 60 has been sequenced through the specified number of cycles (14), completing the extraction of the subject Add instruction, during this time the two character A address and B address of the instruction will have been stored in the A and B registers respectively of the control memory 32 and the OP code, previously stored in the OP code register 48, will have been modified and transferred to the address register 62 to effect execution of the Add instruction.

From FIG. 2, it is seen that the portion of the extraction operation not tested previously involves both the extraction of the second character of the A address and the extraction of the two character B operand address. This portion of the extraction operation is effected in a manner similar to that described above relative to the extraction of the two characters of the A operand address which involved sequencing through the addresses 102–105.

The above sequence of operations relating to the extraction of the second character of the A address and two character B address are effected within the next 6 cycles wherein the appropriate sub-command signals are generated as an output from the control register 44 when cycled through the sequence of the storage locations corresponding to the addresses 117, 120, 106, 107, 110 and 111 of the FIG. 2. Since the particular instruction being traced calls for the B operand address directly, the storage location referenced during the next cycle corresponds to the address 112 and the group of sub-command signals produced upon the readout thereof effects the referencing from the storage location $MM_{S+5}$ of the main memory 30. The character which is read out into the register 34, in this example, is sensed as a word mark character by the word mark sensing logic which is operative to produce the signal WM. This signal, WM, is applied as an input to the branch and control logic 70 and effects the branching of address sequencing to the address 121. The sensing of the character readout as a word mark character denotes the termination of the extraction operation relative to the processing of the subject Add instruction. The further cycling of the control store 60, whereby the contents of the storage location 121 is referenced, is an additional cycle included only for synchronization purposes during which no transfers from the main memory 30 are attempted.

During the next cycling of the control store 60, sub-command signals appearing at the output of the register 64 effect the creation of an address from the OP code, previously stored in the register 48. This address is transferred from the register 48 to the QR register 62 thereby causing a branching to a starting address in the control store 60 of the microprogram which effects the execution of the subject Add instruction. This address which should correspond to 215 is compared with the contents of the diagnostic address register 88 during the 14th cycling of the control store 60 at which time the contents of the diagnostic counter 80 will have been decremented to all zeros. At this time, the determination of whether the processing of the instruction has proceeded properly is verified by an examination of the results of the above-mentioned comparison.

The sub-command signal EXEC is also produced as an output from the register 64 during this last cycle indicating that the subsequent cycling of the control store 60 is exclusively related to the execution of the subject ADD instruction. By modifying the particular bit configuration of the variant character of DTM instruction, a tracing of a specific portion of the processing of an instruction during the execution thereof may be effected. The tracing of instruction execution is effected in the same manner as described relative to the extraction operation. However, during the tracing thereof, the contents of the diagnostic cycle counter 80 will be decremented by the decrementing signal CD produced by the activation of the AND gate 83. The AND gate 83 will be conditioned by the signals $V_1$, T, Trace, $V_2$ and EXEC applied thereo.

In accordance with the preferred embodiment of the subject invention, the tracing of a particular instruction may be effected beginning either with the extraction or execution thereof. The advantages of this arrangement are readily apparent in that once having determined that instruction extraction is proceeding normally, it may be desirable to effect further testing only relative to the execution of various instructions in which case each instruction is extracted in a normal manner.

It will be appreciated that the above teachings are not to be in any way limited to the particular type of system disclosed herein. For example, the principles of the invention may be utilized in testing the processing of a possibly faulty program in a computer wherein the above diagnostic hardware may monitor the results of the working or main program as it is sequenced through the various stages of operation without encountering the faulty program portions.

While, in accordance with the provisions of the statutes, there have been illustrated and described the best forms of the invention known, it will be apparent to those skilled in the art that changes may be made to the apparatus described without departing from the spirit of the invention as set forth in the appended claims and that, in some cases, certain features of the invention may be used to advantage without a corresponding use of other features.

Having now described the invention, what is claimed as new is:

1. For a data processing apparatus comprising a memory portion for storing program instructions therein, a control sequencing means for generating control signals upon each cycling thereof to effect the processing of said instructions, said control sequencing means comprising an address register, diagnostic apparatus for testing the sequencing of said control sequencing means during the processing of a specified portion of any one of said program instructions, said diagnostic apparatus comprising:

a diagnostic address register means for storing a predicted address, counter means connected to be set to a predetermined count corresponding to said specified portion of the program instruction under test, said counter means being connected to be responsive to each cycling of said control sequencing means during the processing of said instruction so as to have said contents modified thereby, comparator means coupled to said diagnostic storage address register and to said control sequencing address register means, said comparator means being connected to be responsive to said counting means after having been modified to said predetermined count to compare the contents of said diagnostic storage address register means and said control sequencing address register means for determining whether sequencing within the number of cycles specified has advanced to said predetermined address during the processing of said program instruction.

2. For a data processing apparatus comprising a memory portion for storing program instructions therein, a control sequencing portion comprising an addressable read-only memory comprising a plurality of addressable storage locations, input address register means operatively connected to said control sequencing portion for identifying storage locations therein to be referenced during the cycling of said control sequencing means, said control sequencing portion further including address logic sequencing means coupled to said input address register means, said address logic sequencing means being connected to be responsive to signals representative of external and internal system conditions to effect the referencing of appropriate sequences of storage locations in said addressable read only memory during the normal processing of said program instructions, diagnostic apparatus for testing the sequencing of said control sequencing means during the processing of a specified portion of any one of said program instructions, said diagnostic apparatus comprising:

a diagnostic address register means connected to store a predicted address, counter means connected to be set to a predetermined count corresponding to the specified portion of the program instruction under test, means connected to decrement by one the contents of said counter means during each cycling of said control sequencing means, comparison means coupled to said counter means, said comparison means operative upon said contents of said counter having been decremented to a count of zero to compare the contents of said diagnostic storage address register means and said input address register means, and means coupled to said comparison means operative to store an indication of the results of said comparison and for interpreting an indication of a non-comparison as indicative of a fault in said address logic sequencing means.

3. The apparatus of claim 2 wherein said last-recited means further includes gating means coupled to said control sequencing portion, and to said counter means, said gating means responsive to said non-comparison to generate an output control signal to inhibit further cycling of said control sequencing portion.

4. For a data processing apparatus comprising a memory portion for storing program instructions therein, a control sequencing portion for generating control signals during each cycling thereof to effect the processing of said stored instructions wherein said control sequencing portion comprises an addressable control store, a first register for storing address used in referencing said addressable control store during each cycling thereof and an output register for temporarily storing the contents of a reference location in said addressable control store, control sequencing logic means coupled to said first address register and to said output control register, said logic sequencing means connected to be responsive to signals representative of external and internal system conditions from said data processing apparatus for effecting the appropriate sequencing of said control sequencing portion during the processing of said program instructions, diagnostic apparatus for testing said control sequencing logic means, said diagnostic apparatus comprising:

a diagnostic storage address register, counter means, said counter means being adapted to have its contents modified in accordance with the cycling of said control sequencing means, means coupled to said memory portion and connected for loading a predicted address and a predetermined count into said diagnostic storage address register means and said counter means respectively, comparator means coupled to said storage address register means and control sequencing means, said comparator means also coupled to said counter means and connected to be responsive to said counter means after the contents of said counter means have been modified to said predetermined count to compare the contents of said address storage means and said sequence address storage means, indicator means coupled to said comparator means and connected to store an indication of the results of said comparison, and gating means coupled to said indicator means and to said counter means, and said control sequencing portions connected to be responsive to gating means, said gating means when activated upon having been previously conditioned by a stop control signal and a signal from said indicator interpreted as a non-comparison to inhibit the further cycling of said control store.

5. For a data processing apparatus comprising a memory portion for storing program and diagnostic instructions therein, a control sequencing portion for generating a plurality of control signals during each cycling thereof for processing said program instruction stored in said memory portion, said control sequencing portion comprising an addressable control store, an address register means connected to reference storage locations within said control store, an output control register for receiving the contents of the storage locations of said control store during the cycling thereof which contents produce said signals for effecting the processing of said program instructions, diagnostic apparatus for testing the sequencing of said control sequencing portion during the processing of any one of said program instructions, said diagnostic apparatus comprising:

a diagnostic storage address register, counter means coupled to said control sequencing portion and connected to have its contents modified in accordance with the cycling of said control store, comparator means coupled to said diagnostic address register and to said address register of said control store, transfer means coupled between said memory portion and said diagnostic address register and counter means respectively, said control store being operative during the processing of a referenced one of said diagnostic instructions to produce signals at the output of said control register transfer from said memory portion by way of said transfer means digital information representative of predetermined address and a predetermined count stored in a location specified by a first address field of said diagnostic instruction to said diagnostic address and counter means respectively, said control store being operative to produce during subsequent cycling thereof in connection with the execution of said diagnostic instruction to signals for processing the portion specified by said predetermined count of a program instruction stored in the memory portion at a location specified by a second one of said address fields of said diagnostic instruction, said comparator means connected to be responsive to said diagnostic counter after its contents have been modified to said predetermined count to compare the contents of said diagnostic address register with said control store address register for determining whether the processing of said program instruction has proceeded normally.

6. The apparatus of claim 5 wherein said control sequencing means is operative during the processing of a second one of said diagnostic instructions to transfer by way of said transfer means a different predetermined address and different predetermined count specified by said first address field of said second diagnostic instruction to said diagnostic address register and counter means respectively, said control sequencing portion being operative during the subsequent cycling thereof in connection with the execution of said second diagnostic instruction to reinitiate the processing of a greater portion of said program instruction as specified by said predetermined count.

7. Apparatus of claim 5 wherein said data processing apparatus includes a control register for storing a control character of said diagnostic instruction and wherein said diagnostic apparatus further includes decoding means, said decoding means being coupled to said control register and to said diagnostic counter, said decoding means being conditioned by said control character to generate output signals for conditioning said diagnostic counter during the cycling of said control store so as to have its contents modified thereby starting either with the extraction or execution processing of said program instruction.

8. Apparatus of claim 6 wherein said diagnostic apparatus further includes indicator means, logic gating means, said indicator storage means being connected to said comparator means and to said control logic means and said control logic means connected to said control sequencing portion and to said decoding means, said decoding means including means connected to be conditioned by said control character for generating a control stop signal, said storage indicator means being connected to store the results of said comparison and connected to condition said logic gating means upon an unsuccessful comparison only when previously conditioned by said control stop signal to inhibit further cycling of said control store.

9. For a data processing apparatus comprising a memory portion for storing program and diagnose instructions therein, a control sequencing portion for generating a plurality of sub-command control signals during each cycling thereof while processing one of said program instructions stored in said memory portion, said control sequencing portion comprising an addressable control store, an address register means connected to reference storage locations within said control store, diagnostic apparatus for testing the sequencing of said control sequencing portion during the processing of any one of said program instructions, said diagnostic apparatus comprising; a diagnostic storage address register, counter means couple to said control sequencing portion and connected to have its contents modified in accordance with the cycling of said control store, comparator means coupled to said diagnostic address register and to said address register of said sontrol store, transfer means coupled between said memory portion and said diagnostic address register and counter means respectively, said control store being operative during the processing of a referenced one of said diagnostic instructions to generate signals for transferring from the memory portion by way of said transfer means, digital information representative of a predetermined address an a predetermined count stored in a location specified by a first address field of said diagnostic instruction to said diagnostic address and counter means respectively, said control store being operative to produce control signals during the subsequent cycling thereof in connection with the execution of said diagnostic instruction, said data processing apparatus being responsive to said control signals for processing the portions corresponding to said predetermined count of a program instruction stored in the memory portion of a location specified by a second one of said address fields of said diagnostic instruction, said comparator means being connected to be responsive to said diagnostic counter after its contents have been modified to said predetermined count to compare the contents of said diagnostic register with said control store address register, indicator means coupled to said comparator, said indicator means operative to store an indication of the results of said comparison and said control store during subsequent cycling being operative to produce further control signals, said data processing apparatus being responsive to said further control signals pursuant to a favorable comparison, to reference a second diagnostic instruction from said memory portion whereby digital information representative of a different predicted address and count are transferred to said diagnostic address register and counter means respectively for the re-initiation of the processing of a greater portion of said program instruction.

References Cited

UNITED STATES PATENTS

| | | | |
|---|---|---|---|
| 3,237,168 | 2/1966 | Hertz | 340—172.5 |
| 3,283,307 | 11/1966 | Vigliante | 340—172.5 |
| 3,292,155 | 12/1966 | Neilson | 340—172.5 |
| 3,374,472 | 3/1968 | Wissick et al. | 340—172.5 |

MALCOLM A. MORRISON, Primary Examiner

C. E. ATKINSON, Assistant Examiner

U.S. Cl. X.R.

340—172.5